Patented Sept. 28, 1943

2,330,203

UNITED STATES PATENT OFFICE 2,330,203

DYE INTERMEDIATE

Leslie G. S. Brooker and William Waldo Williams, Rochester, N. Y., assignors to Eastman Kodak Company, Rochester, N. Y., a corporation of New Jersey No Drawing. Application August 21, 1940, Serial No. 353,500

9 Claims. (Cl. 260—304)

This invention relates to dye intermediates and to a process for the preparation thereof.

A class of intermediates of great value for the preparation of polymethine dyes consists of the cyclammonium alkyl quaternary salts containing a methyl group in the alpha or gamma position, i. e. in one of the so-called reactive positions. Some of these alkyl quaternary salts are, of course, more readily available than others, while the corresponding aryl quaternary salts are almost wholly unavailable. Polynitro aryl pyridinium salts have been prepared by condensing polynitro phenyl halides with pyridine, but the condensation does not take place with quinoline nor with α-picoline. Furthermore, aryl halides devoid of nitro groups will not react even with pyridine to give quaternary salts.

We have now found a new method for preparing cyclammonium quaternary salts containing a reactive methyl group, which method is applicable to the production of both alkyl and aryl quaternary salts. By means of our new method, aryl quaternary salts, heretofor unknown, are made available for the first time.

It is, accordingly, an object of our invention to provide a new process for preparing quaternary salts. A further object is to provide new quaternary salts. Other objects will become apparent hereinafter.

In accordance with our invention, we prepare cyclammonium quaternary salts containing a reactive methyl group, by hydrolyzing, in the presence of an acid, a N-alkyl- or a N-aryl heterocyclic nitrogen base containing, in the alpha or gamma position to the nitrogen, a dicarbalkoxymethylene group. The reaction can be illustrated for the benzothiazole series as follows:

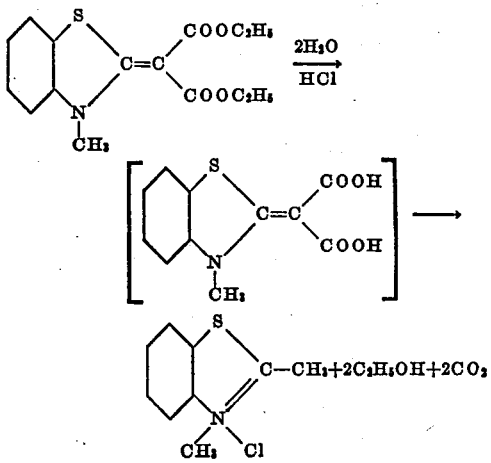

Our process is especially applicable to the benzothiazole series and to such other series as contain heterocyclic nuclei capable of withstanding the conditions of the acid hydrolysis, without rupture of the heterocyclic ring.

In accordance with a preferred embodiment of our invention, the hydrolysis of the N-alkyl- or N-aryl heterocyclic nitrogen bases containing the dicarbalkoxymethylene group is effected, in the presence of hydrochloric acid. Mineral acids are especially suitable for the practice of our invention, sulfuric, phosphoric and hydrobromic acids being further examples of acids which can be employed. Heat accelerates the hydrolysis.

The following examples will serve to illustrate the manner of practicing our invention. These examples are not intended to limit our invention.

EXAMPLE 1.—*2,3-dimethylbenzothiazolium perchlorate*

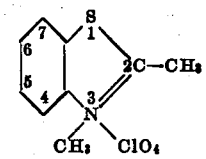

5.0 g. (1 mol.) of 2-dicarbethoxymethylene-3-methylbenzothiazoline were mixed with 25 cc. of 15% aqueous hydrochloric acid. The mixture was boiled gently, under reflux, for 20 minutes, or as long as carbon dioxide was evolved. The resulting colorless solution was concentrated to dryness by heating on the steam bath under reduced pressure. The residue was 2-methylbenzothiazole methochloride. It was dissolved in 20 cc. of hot water. The resulting solution was filtered and to the filtered solution were added 0.4 g. of sodium perchlorate dissolved in 10 cc. of hot water. The quaternary perchlorate separated from the hot solution. After chilling the solution in ice water, the quaternary perchlorate was filtered off, washed with a little cold water, a little cold ethyl alcohol and finally dried in the air. The resulting material was recrystallized from ethyl alcohol (49 cc. per gram of material) and obtained, in 84% yield, as colorless needles, melting at 124° to 125° C.

The 2-dicarbethoxymethylene-3-methylbenzothiazoline employed in the above example was prepared in the following manner: 12.3 g. (1 mol.) of 2-methylmercaptobenzothiazole metho-p-toluene-sulfonate, 10.7 g. (1 mol.+100% excess) of diethyl malonate and 3.4 g. (1 mol.) of triethylamine were placed in 30 cc. of absolute ethyl alcohol. The mixture was boiled, under reflux, for 30 minutes. Upon chilling the mixture to 0° C., a white crystalline product separated. It was twice recrystallized from ethyl alcohol and obtained as colorless crystals melting at 119° to to 121° C.

In a manner similar to that illustrated in the above example, 2-methyl-3-ethyl- and 2-methyl-3-amylbenzothiazolium salts, as well as other cyclammonium alkyl quaternary salts containing a reactive methyl group can be prepared.

EXAMPLE 2.—*2-methyl-3-phenylbenzothiazolium iodide*

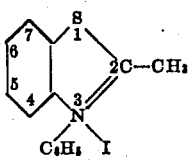

43 g. (1 mol.) of 2-dicarbethoxymethylene-3-phenylbenzothiazoline were mixed with 200 cc. of 20% hydrochloric acid. The mixture was boiled, under reflux, for from one to two hours. The resulting solution was evaporated to dryness under reduced pressure. The crystalline residue was 2-methyl-3-phenylbenzothiazolium chloride. It was dissolved in the minimum quantity of hot absolute ethyl alcohol. To the resulting hot solution were added 35 g. (1 mol.+100% excess) of sodium iodide dissolved in hot absolute ethyl alcohol. The resulting mixture was filtered while hot to remove sodium chloride. The filtrate was allowed to cool, whereupon colorless needles of the thiazolium iodide separated. After two recrystallizations from absolute ethyl alcohol (10 cc. per gram of thiazolium iodide), it was obtained, in 52% yield, as colorless crystals melting at 232° to 234° C.

The 2-dicarbethoxymethylene-3-phenylbenzothiazoline employed in the above example was prepared in the following manner: 4 g. (1 mol.) of 2-methylmercapto-3-phenylbenzothiazolium p-toluene-sulfonate, 3.5 g. (1 mol.+100% excess) of diethyl malonate and 1.0 g. (1 mol.) of triethylamine were placed in 10 cc. of absolute ethyl alcohol. The mixture was boiled, under reflux, on a steam-pot for one hour. The reaction mixture was cooled and the solid material filtered off and washed with absolute ethyl alcohol and dried in the air. A 41% yield of yellow leaflets melting at 170° to 173° C. was thus obtained.

The 2-methylmercapto-3-phenylthiazolium p-toluenesulfonate employed above was obtained in the following manner: 12.2 g. (1 mol.) of 3-phenyl-2-thiobenzothiazolone and 14.0 g. (1 mol.+50% excess) of methyl-p-toluenesulfonate were heated together on a steam bath for four hours. The reaction mixture was cooled, washed with two 100 cc. portions of diethyl ether and triturated with 50 cc. of acetone. The acetone mixture was chilled and the p-toluenesulfonate filtered off and dried in the air. A 85% yield of colorless crystals, melting at 176° to 177° C., was thus obtained. This product and process are described and claimed in our copending application Serial No. 353,501 filed of even date herewith.

The 3-phenyl-2-thiobenzothiazolone used above was prepared as follows: 26 g. (1 mol.) of 3-phenyl-2-benzothiazolone were dissolved in 200 cc. of m-xylene. The solution was heated in an oil bath to 130° C. To this solution were then added slowly 25 g. (1 mol.+100% excess) of phosphorous pentasulfide, with stirring, over a period of 30 to 45 minutes. The mixture was then heated for 8 hours with constant stirring at 120° to 130° C. At the end of this time, the xylene layer was decanted and subjected to evaporation under reduced pressure. The residue from the xylene evaporation was twice recrystallized from absolute ethyl alcohol (10 cc. per gram of solid). In this manner, the 3-phenyl-2-thiobenzothiazoline was obtained in 45% yield as colorless needles melting at 97° to 98° C.

In a manner similar to that illustrated above, 2-methyl-3-naphthylbenzothiazolium quaternary salts can be prepared, as well as other cyclammonium aryl quaternary salts containing a reactive methyl group.

Our new cyclammonium aryl quaternary salts containing a methyl group in a reactive position can be condensed with esters of orthoformic acid to give new carbocyanine dyes as illustrated in the following example.

EXAMPLE 3.—*3,3'-diphenylthiacarbocyanine iodide*

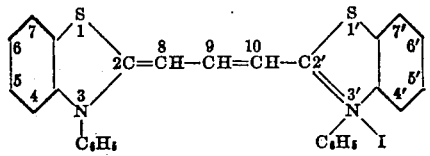

1.8 g. (2 mol.) of 2-methyl-3-phenylbenzothiazolium iodide and 1.5 g. (1 mol.+100% excess) of ethyl orthoformate were placed in 10 cc. of anhydrous pyridine. The resulting mixture was boiled, under reflux, for fifteen minutes. The reaction mixture was then cooled and diluted with 100 cc. of diethyl ether. The dye was then filtered off and allowed to dry in the air. After one recrystallization from 50 cc. of absolute methyl alcohol, 1.2 g. (83% yield) of dye was obtained. After two further recrystallizations from absolute methyl alcohol (50 cc. of alcohol per gram of dye), the dye was obtained as greenish colored leaflets, melting at 276° to 277° C., with decomposition, (yield, 62%). The dye sensitized a photographic gelatino-silver-bromiodide emulsion to 640 mu with a maximum at 600 mu.

As shown in the above example, the ortho ester is advantageously employed in excess.

Our new cylammonium aryl quaternary salts containing a methyl group in a reactive position can also be condensed with diethyl formamidines to give cyclammonium aryl quaternary salts containing an acylated ω-arylaminovinyl group in a reactive position, as illustrated in the following example.

EXAMPLE 4.—*2-(ω-acetanilidovinyl)-3-phenylbenzothiazolium iodide*

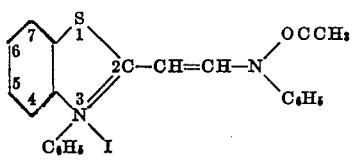

7 g. (1 mol.) of 2-methyl-3-phenylbenzothiazolium iodide and 4 g. (1 mol.+100% excess) of diphenylformamidine were placed in 25 cc. of acetic anhydride. The resulting mixture was boiled, under reflux, for thirty minutes with frequent agitation of the mixture. At the end of this time, the reaction mixture was cooled and diluted with 100 cc. of diethyl ether. The ω-acetanilidovinyl compound was then filtered off, washed with diethyl ether and dried in the air.

In this manner, 4.5 g. (45% yield) of a dark brown powder, melting at 208° to 209° C., with decomposition was obtained.

In a similar manner, ω-acetylated or propionated naphthylaminovinyl derivatives can be prepared.

The ω-arylaminovinyl compounds set forth above can be condensed, in the presence of an acid binding agent, with cyclammonium alkyl or aryl quaternary salts containing a reactive methyl group to give carbocyanine dyes. The ω-arylaminovinyl derivatives set forth above can also be condensed, in the presence of an acid binding agent, with ketomethylene compounds, such as heterocyclic ketomethylene compounds, e. g. rhodanines, to give merocarbocyanine dyes, as illustrated in the following example.

EXAMPLE 5.—3-ethyl-5-[(3-phenyl-2(3)-benzothiazolylidene)-ethylidene]-rhodanine

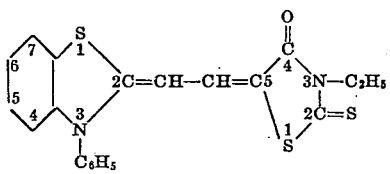

1 g. (1 mol.) of 2-(ω-acetanilidovinyl)-3-phenylbenzothiazolium iodide, 0.32 g. (1 mol.) of 3-ethyl rhodanine and 0.2 g. (1 mol.) of triethylamine were placed in 10 cc. of absolute ethyl alcohol. The resulting mixture was boiled, under reflux, for fifteen minutes. The mixture was then cooled and the dye was filtered off, washed with cold absolute ethyl alcohol and dried. In this manner, 0.8 g. of crude dye was obtained. After two recrystallizations from a mixture of pyridine (20%) and methyl alcohol (80%), (50 cc. of the mixture per gram of dye), the dye was obtained as reddish-brown crystals, melting at 212° to 215° C., with decomposition (yield, 62%). The dye sensitized a photographic gelatino-silver-bromiodide emulsion to approximately 625 mu with a maximum at approximately 590 mu. The dye was a weak sensitizer and produced appreciable desensitization in the blue region.

In a similar manner, other heterocyclic ketomethylene compounds, such as thionaphthenones, thiobarbituric acids and 2-thio-2,4(3,5)-oxazolediones can be condensed with the ω-arylaminovinyl derivatives. In the above example, strong organic bases other than triethylamine can be employed, for example, piperidine, diethylamine or N-methylpiperidine. The reactions can also be carried out, although less advantageously, in the presence of a weak organic base, such as pyridine.

Our new cyclammonium aryl quaternary salts containing a reactive methyl group can also be condensed with dialkylaminobenzaldehydes to give styryl dyes, as illustrated in the following example.

EXAMPLE 6.—2-(p-dimethylaminostyryl-3-phenylbenzothiazolium perchlorate

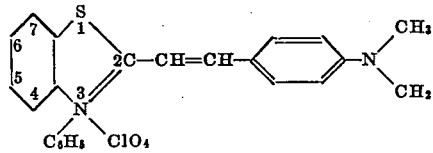

1.4 g. (1 mol.) of 2-methyl-3-phenylbenzothiazolium iodide and 0.6 g. (1 mol.+100% excess) of p-dimethylaminobenzaldehyde were placed in 15 cc. of absolute ethyl alcohol and three drops of piperidine were added to the mixture. The resulting mixture was boiled gently, under reflux, on a steam bath for about fifteen minutes. To the hot reaction mixture were then added, with stirring, 1 g. (1 mol.+100% excess) of sodium perchlorate dissolved in 5 cc. of hot water. The resulting mixture was cooled, the styryl dye filtered off, washed with water and then with absolute ethyl alcohol, and allowed to dry in the air. In this manner, 1.1 g. of dye (57%) yield) were obtained. After two recrystallizations from absolute ethyl alcohol (150 cc. per gram of dye), the dye was obtained in 37% yield as dark green needles, melting at 242° C. to 246° C., with slow decomposition. The dye sensitized a photographic gelatino-silver-bromiodide emulsion very weakly to about 620 mu with a maximum at about 590 mu. The dye bleaches instantly in Kodak developer "D-76" and can be used as a filter dye or in antihalation layers.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

What we claim as our invention and desire to be secured by Letters Patent of the United States is:

1. A process for preparing a benzothiazolium alkyl quaternary salt comprising hydrolyzing, in the presence of an acid, a 3-alkyl-2-dicarbalkoxymethylenebenzothiazoline.

2. A process for preparing a benzothiazolium alkyl quaternary salt comprising hydrolyzing, in the presence of a mineral acid, a 3-alkyl-2-dicarbalkoxymethylenebenzothiazoline.

3. A process for preparing a benzothiazolium alkyl quaternary salt comprising hydrolyzing, in the presence of hydrochloric acid, a 3-alkyl-2-dicarbalkoxymethylenebenzothiazoline.

4. A process for preparing a benzothiazolium phenyl quaternary salt comprising hydrolyzing, in the presence of an acid, a 2-dicarbalkoxymethylene-3-phenylbenzothiazoline.

5. A process for preparing a benzothiazolium phenyl quaternary salt comprising hydrolyzing, in the presence of a mineral acid, a 2-dicarbalkoxymethylene-3-phenylbenzothiazoline.

6. A process for preparing a benzothiazolium phenyl quaternary salt comprising hydrolyzing, in the presence of a mineral acid, a 2-dicarbalkoxymethylene-3-phenylbenzothiazoline.

7. A process for preparing a benzothiazolium phenyl quaternary salt comprising hydrolyzing, in the presence of hydrochloric acid, a 2-dicarbalkoxymethylene-3-phenylbenzothiazoline.

8. A 2-methyl-3-phenylbenzothiazolium quaternary salt of the following formula:

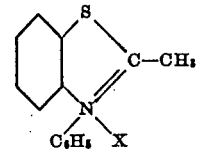

wherein X represents an acid radical.

9. 2-methyl-3-phenylbenzothiazolium iodide.

LESLIE G. S. BROOKER.
WILLIAM WALDO WILLIAMS.

CERTIFICATE OF CORRECTION.

Patent No. 2,330,203. September 28, 1943.

LESLIE G. S. BROOKER, ET AL.

It is hereby certified that error appears in the printed specification of the above numbered patent requiring correction as follows: Page 1, first column, line 11, for "unavoidable" read --unavailable--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.

Disclaimer 2,330,203.—*Leslie G. S. Brooker* and *William Waldo Williams*, Rochester, N. Y. DYE INTERMEDIATE. Patent dated Sept. 28, 1943. Disclaimer filed Jan. 17, 1948, by the assignee, *Eastman Kodak Company*.

Hereby enters this disclaimer to claim 8 of said patent.

[*Official Gazette February 24, 1948.*]